(12) United States Patent
Fraboulet-Laudy et al.

(10) Patent No.: US 8,818,929 B2
(45) Date of Patent: Aug. 26, 2014

(54) METHOD AND SYSTEM FOR MERGING DATA OR INFORMATION

(75) Inventors: Claire Fraboulet-Laudy, Paris (FR); Jean-Gabriel Ganascia, Paris (FR)

(73) Assignees: Centre National de la Recherche Scientifique, Paris (FR); Thales, Neuilly sur Seine (FR); Universite Pierre et Marie Curie, Paris (FR)

( * ) Notice: Subject to any disclaimer, the term of this patent is extended or adjusted under 35 U.S.C. 154(b) by 588 days.

(21) Appl. No.: 13/140,807

(22) PCT Filed: Dec. 21, 2009

(86) PCT No.: PCT/EP2009/067666
§ 371 (c)(1), (2), (4) Date: Dec. 5, 2011

(87) PCT Pub. No.: WO2010/070142
PCT Pub. Date: Jun. 24, 2010

(65) Prior Publication Data
US 2012/0072402 A1    Mar. 22, 2012

(30) Foreign Application Priority Data
Dec. 19, 2008 (FR) ...................... 08 07232

(51) Int. Cl.
G06F 17/00 (2006.01)
G06N 5/02 (2006.01)
G06N 5/00 (2006.01)

(52) U.S. Cl.
CPC ...................... *G06N 5/003* (2013.01)
USPC ........................................... 706/49

(58) Field of Classification Search
CPC ....................................... G06N 5/003
USPC ............................................. 706/49
See application file for complete search history.

(56) References Cited

U.S. PATENT DOCUMENTS

2008/0005175 A1* 1/2008 Bourke et al. ............ 707/104.1
2011/0010329 A1  1/2011 Pichon et al.

FOREIGN PATENT DOCUMENTS

FR    2 919 407 A1    1/2009

OTHER PUBLICATIONS

'Natural language text processing and the maximal join operator': Peterman, Springer, 1996, Conceptual Structures: Knowledge Representation as Interlingua Lecture Notes in Computer Science vol. 1115, 1996, pp. 100-114.*
'High level fusion based on conceptual graphs': Laudy, 2007, IEEE, 978-0-662-45804-3.*

(Continued)

*Primary Examiner* — Kakali Chaki
*Assistant Examiner* — Peter Coughlan
(74) *Attorney, Agent, or Firm* — Baker Hostetler LLP

(57) ABSTRACT

A method for merging information of high semantic level representing complex situations including several objects originating from several sensors $c_i$, said information possibly being heterogeneous, said method including acquiring the various items of information arising from said sensors in raw form and transforming them so as to cast them into the form of conceptual graphs, a conceptual graph representing several concepts and the relations which exist between them, and being composed of entity nodes and relation nodes, with E the set of concept nodes defined on a support S, $G_1$ and $G_2$ two conceptual graphs defined on S, wherein the method determines a merging strategy denoted $strategy_{merge}$ as follows: $strategy_{merge} = f_{merge} \bigcirc f_{comp}: E \times E \rightarrow E \cup \{E \times E\}$ and said merging strategy is applied to the various items of information taking the form of graphs.

10 Claims, 5 Drawing Sheets

(56) References Cited

OTHER PUBLICATIONS

C. Laudy, J.-G. Ganascia: "Information fusion in a TV program recommendation system," Proceedings of the 11th International Conference on Information Fusion (Fusion '08), Jun. 30, 2008, XP031326422.

C. Laudy, J.-G. Ganascia, C. Sedogbo: "High-level fusion based on conceptual graphs," Proceedings of the 10th International Conference on Information Fusion (Fusion '07), Jul. 9, 2007, XP031193922.

M. Croitoru, B. Hu, S. Dashmapatra, P. Lewis, D. Dupplaw, L. Xiao: "A conceptual graph based approach to ontology similarity measure," Lecture Notes in Artificial Intelligence, vol. 4604, Jul. 22, 2007, pp. 154-164, XP019065871, paragraphs [0003], [0004].

Claire Laudy, et al., "Information Fusion Using Conceptual Graphs: a TV Programs Case Study", Central Europe Workshop Proceedings (ceur-ws.org), Jun. 11, 2008, pp. 157-165, vol. 354, XP002541612.

\* cited by examiner

TV program hierarchy

[Program] -
        -> (start) -> [Date]
        -> (stop) -> [Date]
        -> (original language) -> [Language]
        -> (broadcast_language) -> [Language]
        -> (duration) -> [Duration]
        -> (content) -> [Content]-
                                    -> (description) -> [Text]
                                    -> (title) -> [Title]
                                    -> (topic) -> [Topic]
        -> (broadcast_support) -> [Channel]
        -> (show-view) -> [ShowViewNumber]

TV Program Model

FIG.6A

[Program #0] -
    - (diffusion_support) -> [Channel = "tf1"],
    - (start) -> [Date = "2006.11.27.06.47.54"],
    - (end) -> [Date = "2006.11.27.08.30.27"],
    - (content) -> [Content] - (title) -> [Title = "TF ! JEUNESSE"]

---

[Program #0] -
    - (diffusion_support) -> [Channel = "tf1"],
    - (start) -> [Date = "2006.11.27.06.45.00"],
    - (end) -> [Date = "2006.11.27.08.35.00"],
    - (show-View) -> [showViewNumber = "5755621"]
    - (content) -> [Content] - (title) -> [Title = "TF ! JEUNESSE"]

Observations on DVD stream
and "télépoche"

FIG.6B

```
Entity
  -s-> Relation
    -s-> belongs
    -s-> has_a
    -s-> directs
    -s-> has_as_origin
    -s-> conflict
    -s-> occupies_function
    -s-> contains
    -s-> characterizes
    -s-> ascari
    -s-> assassinate
    -s-> oppress
    -s-> threaten
    -s-> confrontation
    -s-> attack
    -s-> wreck
    -s-> evacuate
    -s-> repress
    -s-> patient
    -s-> nomination
    -s-> modify
    -s-> meets
    -s-> proceeds
    -s-> discontent
    -s-> date
    -s-> agent
    -s-> victim
    -s-> opposed_to
    -s-> supports
  -s-> Person
  -s-> Group of People
    -s-> ReligiousGroup
    -s-> PoliticalParty
    -s-> EthnicGroup
    -s-> Family
    -s-> Population
  -s-> Function
    -s-> DirectorFunction
  -s-> Nationality
  -s-> Religion
  -s-> PoliticalTendency
  -s-> Culture
  -s-> Place
    -s-> GeographicalZone
      -s-> Country
      -s-> Region
      -s-> Town
  -s-> GeographicalOrigin
  -s-> Crisis
  -s-> Tension
  -s-> Oppression
  -s-> Colonization
  -s-> ExternalStateInfluence
  -s-> Corruption
  -s-> Regime
  -s-> Change
    -s-> Fluctuation
  -s-> HDI
  -s-> Wealth
    -s-> Product
    -s-> Service
  -s-> Company
  -s-> Industry
  -s-> IndustryStatus
    -i-> IND_public
    -i-> IND_private
    -i-> IND_mixed
  -s-> Arrest
  -s-> Imprisonment
  -s-> Violence
  -s-> Election
  -s-> EconomicConcept
    -s-> GDP
    -s-> GNP
    -s-> Exports
    -s-> Imports
    -s-> Economy
  -s-> Curfew
  -s-> Shots
  -s-> Gunfire
  -s-> Racism
    -s-> Ivoirity
  -s-> Interest
  -s-> ConflictInterest
  -s-> Threat
  -s-> CoupDEtat
  -s-> Massgrave
  -s-> Event
    -s-> Repression
  -s-> Date
    -s-> DateCal
    -s-> DateJ
  -s-> Newspaper
  -s-> Value
    -s-> Security
  -s-> Influence
    -s-> NegativeInfluence
    -s-> PositiveInfluence
```

FIG. 7

METHOD AND SYSTEM FOR MERGING DATA OR INFORMATION

CROSS-REFERENCE TO RELATED APPLICATIONS

This application is a National Stage of International patent application PCT/EP2009/0677666, filed on Dec. 21, 2009, which claims priority to foreign French patent application No. FR 08 07232, filed on Dec. 19,2008,the disclosures of each of which are incorporated by reference in their entireties.

FIELD OF THE DISCLOSED SUBJECT MATTER

The invention relates to the merging of information originating from several sensors and more particularly to the processing of information or data arising from heterogeneous sensors, the data or information possibly themselves being non-homogeneous. The merging operation is operated by means of a processor, for example, within a surveillance system. On completion of this operation, the result is sent, for example in the form of a control signal. The signal may be a signal triggering a monitoring process, or else a process for displaying the information arising from the merge. It may also take the form of an alarm signal.

BACKGROUND

Systems incorporating several sensors are used in a great variety of sectors, such as site surveillance, maintenance, robotics, meteorological forecasts, but also the programming of systems or devices such as TV program recordings. Such systems can also be implemented in systems for interpreting information arising from the media. The merging of information or data is a paramount process in decision making, and is so whatever the sector of interest in which the decision is made. Indeed, the first step in a decision making process is the collection of information or data making it possible to evaluate a situation. This information can originate from varied sources and be expressed in various formats or media. Once collected, the information must be combined and arranged so as to obtain an overall but summary view of the situation. This combining of information of heterogeneous nature into a single and coherent view constitutes a complex problem to be solved, but which is, however, necessary in order to trigger and control actions as a function of the result of the merge.

A great majority of the studies relating to information merging is devoted to merging homogeneous and essentially low-level numerical data. Other procedures consist in merging low-level data so as to deduce higher-level information therefrom. For example, the data arising from seismic, acoustic, chemical sensors, etc. are merged and interpreted so as to detect, more generally, the presence of a person in a room or the use of a computer. These procedures are, however, concerned with input data which are digital and low-level, even if the output from the merging system is an item of information of higher semantic level. The low-level data are, for example, radar tracks, coordinates of objects, speeds, etc. The interpretation of these data is simple and does not require a general knowledge of the sector of interest.

Certain information merging procedures rely on Dempster-Shafer theory, a theory which generalizes probability theory, and thus uses belief functions. Belief functions are known for their ability to faithfully represent information and the truth of this information. Patent application FR 0705528 from the Applicant is an example of its implementation for merging information arising from independent sensors.

Owing to the generalization of computerized systems and the technological advances in sensors responsive to physical events, information sources have multiplied and diversified. Correlatively, the modalities (text, speech, image, RADAR signal, etc.) under which the information is given have, likewise, multiplied. In order to benefit from the multiplicity of sources and to construct a global representation of the world, it therefore becomes necessary to merge the information together, and to do so whatever its modality. The merging of information may be split into several levels. The first relates to the merging of information pertaining to the characteristics of the objects. This level of merging makes it possible to identify and refine, by merging several observations, the estimation of the characteristics of the objects present in the world. The second level pertains to the merging of objects. This involves appreciating the state of the objects present in the world. The third pertains to the discovery of relations between the various objects present in the world.

One of the aims of the present patent application is to incorporate heterogeneous information by merging it at a high level of representation and by taking account of the semantics that it conveys. The expressions "high level of representation or else high semantics" are used to differentiate the objects aimed at by the present patent application from low-level digital data. Thus the objects processed by the method according to the invention take the form of a sentence, expression, syntax, etc. Thus, one of the objectives of the present patent application is to merge symbols rather than numbers and to have a symbolic representation of objects and heuristics. The heuristics will be expressed as a function of the semantics (i.e. meaning) of the information to be merged.

The publication by Laudy et al, entitled "High-level fusion based on conceptual graphs, in 10th International Conference on Information Fusion, Quebec 2007, and that of 2008, "Information fusion using conceptual graphs: a TV programs case study, in additional Proceeding of the 16th International Conference on Conceptual Structures, Toulouse, France, pp 158-165, propose an approach for symbolic merging relying on the use of conceptual graphs known to a person skilled in the art.

The aforementioned publication of 2008 describes the use of the formalism of conceptual graphs to represent knowledge and information within the framework of a recommendation system for intelligent digital television. The recommendation system analyses the descriptions of the televised programs and decides whether or not to recommend a program to a specific user. Accordingly, the authors use a merging platform to obtain accurate and sure descriptions of televised programs, both as regards programming planning and the description of the content of the program.

The conceptual graphs model proposed by JF Sowa and taken up in the aforementioned publication is essentially composed of a support and of the graphs themselves. A conceptual graph represents several concepts and the relations which exist between them. The conceptual graphs are composed of entity nodes and relation nodes. FIG. 1 represents entities which are drawn in the form of rectangles whereas the relations are ovals. The theory of conceptual graphs relies, inter alia, on the use of a support. The support is a hierarchy of the types of concepts and of relations manipulated. That is to say it involves the set of all the types of objects and relations present in the real world that will be represented, organized in the form of a hierarchy. The support can therefore be viewed as a simplified ontology of the sector of interest which comprises solely the types of objects and the type of relation. A concept node of a conceptual graph is represented by two entities and can be written in the following form: [T: r]. T is the type of concept. It is the type of object of the real world which is represented. r is the value or the measurement observed for the object represented. For example, to represent a temperature of 30 degrees, it will be possible to write the concept [Temperature: 30], where Temperature is the type of the concept and 30 is its value, also called the referent in the subsequent description.

Concerning the merging process itself, it also relies on the conceptual graphs model. The maximal join operation defined by Sowa recalled in the aforementioned articles is used to merge two compatible sub-graphs of two conceptual graphs. FIG. 1 illustrates this operation. Thus, the graph $G_3$ is the result of merging $G_1$ and $G_2$ using the maximal join. However, the use of the maximal join alone is not sufficient to merge information originating from real systems. Real data are indeed noisy and knowledge about the sector is often necessary in order to merge two compatible but different values. For example, observations like a person named "J. Smith" and a person named "M. John Smith" are not equal, but the knowledge parameter prompts the thought that these two observations refer to the same person. This can also apply to data representative of a physical parameter measured by a sensor whose measurement unit is not expressed according to one and the same format. The procedures and devices according to the prior art do not make it possible to address the aforementioned problem area. They are restricted to data stored in numerical form (not character strings, for example) and are implemented within the very simple situational framework, amounting to a measurement or to the state of a characteristic of an object. Here, therefore, one of the objectives is to propose a procedure making it possible to merge information representing complex situations.

Existing approaches to information merging are very broadly geared toward the merging of simple data: merging is carried out so as to obtain the value of a single characteristic of a single object. In contradistinction to these approaches, the method and the system according to the invention make it possible to represent and directly merge information of high semantic level within the framework of complex situations, where several players or objects are involved, linked by spatial, temporal or semantic relations.

SUMMARY

An aim of the invention is notably to render parameterizable the method for merging information or data by taking into account notably domain knowledge and user preferences, and, by means of a suitably adapted merging process for example, to succeed in merging data or information which are initially presented in heterogeneous formats and which satisfy the compatibility criterion according to a fixed threshold value.

The subject of the invention relates to a method for merging information of high semantic level representing complex situations composed of several objects or data originating from several sensors ci, said information or data possibly being heterogeneous, said method being executed on a processor and comprising the following steps:

acquiring the various items of information or data arising from at least two sensors in raw form and transforming them within said processor so as to cast them into the form of conceptual graphs, a conceptual graph representing several concepts and the relations which exist between them, a conceptual graph being composed of several entity nodes ci and of relation nodes, with E the set of concept nodes defined on a support S, $G_1$ and $G_2$ two conceptual graphs defined on S, the graphs thus obtained being stored in a database, defining a knowledge base containing information specific to the sector of application of the data merge and the rules applied in said sector of application, and subjecting said information to a transform within the processor so as to present it in a form of conceptual graphs, the method being characterized in that it comprises a step where a merging strategy denoted strategy$_{merge}$ is determined as follows: strategy$_{merge}$=f$_{merge}$○f$_{comp}$:E×E→E∪{E×E} where f$_{merge}$:{true, false}×E×E→E∪{E×E} is a function for merging the concept nodes of the graphs, and f$_{comp}$: E×E→{true, false}×E×E is a function for testing compatibility between two concept nodes of the graphs, and in that the method comprises a step in the course of which said merging strategy is applied to the various items of information arising from the knowledge base and from the observation base taking the form of graphs, on completion of which step the merged data are sent to a decision making system.

The method uses, for example, as compatibility function between two nodes a function expressed in the following form:

$$f_{comp}:E\times E\to\{true,false\}\times E\times E$$

where E is the set of concept nodes defined on a support S and $G_1$ and $G_2$ are two conceptual graphs defined on S to be compared.

$$\forall (c_1,c_2)\epsilon E\times E, \exists v=f_{comp}(c_1,c_2)\epsilon V \text{ and } v=(b,c_1,c_2)$$

where v ⊂ {true, false}×E×E
and b∈{true, false} where b is a logic value.

According to another embodiment, the method uses a compatibility function f$_{comp}$ between two concept nodes $c_1$, $c_2$ of said graphs $G_1$, $G_2$ which is determined with respect to the similarity existing between the two elements of two graphs to be merged with f$_{comp}$($c_1$, $c_2$)=sim($c_1$, $c_2$) greater than or equal to a threshold value.

In order to define the compatibility of two elements as a function of the proportion of constituents that are identical between these two elements, the method comprises a normalized similarity measure complying with the following conditions ($k_1$), ($k_2$) and ($k_3$):

$$\forall (e,e')\epsilon E\times E; sim(e,e')=sim(e',e)(symmetry) \quad (k_1)$$

$$\forall (e,e')\epsilon E\times E \text{ with } e \text{ different from } e'; sim(e,e)=sim(e',e')>sim(e,e') \quad (k_2)$$

$$\forall e\epsilon E sim_{norm}(e,e)=1 \quad (k_3)$$

with E the set of concept nodes defined on a support S, sim a similarity index defined on E×E–>R+

It is possible to use a compatibility function f$_{comp}$ between two concept nodes $c_1$, $c_2$ to be compared, a concept node being associated with a graph respectively $G_1$, $G_2$, calculated as a function of a distance defined such that f$_{com}$($c_1$, $c_2$)=dist ($c_1$, $c_2$) is less than or equal to a threshold value.

The distance measure is determined, for example, as a function of the data stored in the knowledge base and satisfies the conditions ($k_1$), ($k'_2$), ($k_4$) and ($k_5$)

$$\forall (e,e')\epsilon E\times E; sim(e,e')=sim(e',e)(symmetry) \quad (k_1)$$

$$\forall e\epsilon E diss(e,e)=0 \quad (k'_2)$$

$$dist(e,e')=0=>e=e' \quad (k_4)$$

$$dist(e,e')\leq dist(e,e'')+dist(e'',e')\forall e,e',e''\epsilon E(\text{triangular inequality}) \quad (k_5)$$

The merge function may be determined in the following manner:

$$f_{merge}: \{true, false\} \times E \times E \to E \cup \{E \times E\}$$

where E is the set of concept nodes defined on a support S and $G_1$ and $G_2$ are two conceptual graphs defined on S to be merged.

Moreover:

$$\begin{cases} f_{merge}(true, c_1, c_2) = f_{mer}(c_1, c_2) = c \\ f_{false}(true, c_1, c_2) = Id(c_1, c_2) = (c_1, c_2) \end{cases}$$

where $f_{mer}$: E×E→E is a function defined by an expert in the sector of application, c∈E is the concept resulting from the merging of $c_1$ and $c_2$
and Id is the identity function defined on E×E.

The invention also relates to a system for merging information of high semantic level representing complex situations composed of several objects or data originating from several sensors ci, characterized in that it comprises at least the following elements:
  several sensors Ci allowing the observation of information and inputs,
  a knowledge base comprising elements characteristic of the merging application and suitable for parameterizing the merging step executed in the method as claimed in claim 1,
  and an information base containing all the data arising from the sensors,
  a processor adapted for transforming information arising from the knowledge base and from the information base into a form of representation of conceptual graphs, said formatted information being sent to a processor suitable for executing the following steps:
    a step where a merging strategy denoted strategy$_{merge}$ is determined as follows: strategy$_{merge}$=$f_{merge}\bigcirc f_{comp}$: E×E→E∪{E×E}where $f_{merge}$:{true, false}×E×E→E∪{E×E} is a function for merging the concept nodes of the graphs, and $f_{comp}$: E×E→{true, false}× E×E is a function for testing compatibility between two concept nodes of the graphs.
    a step in the course of which said merging strategy is applied to the various stored items of information taking the form of graphs, on completion of which step the merged data are sent to a decision making system,
  at least one output linked up with devices for controlling recording and/or displaying the results arising from the merging of data.

The merging system is, for example, associated with a device for recording TV programs and in that it comprises two sources of information which provide data, processed so as to associate a conceptual graph with each, the information arising from these graphs being merged by taking account of the user preferences present in the knowledge base and in that it comprises a module suitable for associating with a TV transmission a category and a module transmitting a representative signal or else a control signal to said recording device.

BRIEF DESCRIPTION OF THE DRAWINGS

The invention will be better understood and other advantages will be more apparent on reading the detailed description of embodiments given by way of example, which description is given in relation to appended drawings which represent:

FIG. 7, an exemplary ontology for the sector of crisis management.

DETAILED DESCRIPTION

Principle of the Method

The method is applicable with regard to information transmitted in the form of natural language, text or audio, of semi-structured data or else of low-level data, insofar as there exists a system, automated or not, making it possible to describe, in the form of conceptual graphs, the content of this information by casting the latter back into its context.

Figure 2:
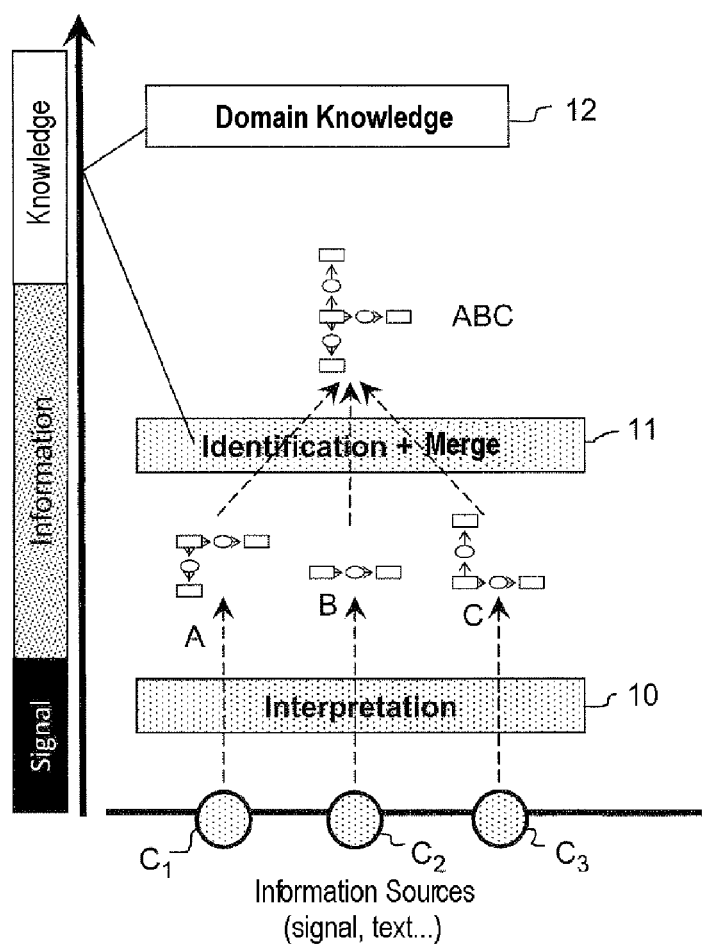
FIG. 2, a schematic of the method implemented in the present invention in accordance with the various levels of interpretation (amount of knowledge of the sector required in order to represent the information), FIG. 3, a schematic of the method implemented in the present invention, in accordance with the data stream, FIG. 4, an exemplary architecture for recording the TV application, FIG. 5, an exemplary hierarchy for a television program, and FIGS. 6A and 6B, information related to a television program.

FIG. 2 shows diagrammatically an exemplary implementation of the method for various sensors $C_1$, $C_2$, etc. which constitute several different information sources. The information picked up is firstly extracted by an extraction or interpretation system 10 the function of which is notably to obtain the observation of A and the observation of B. The two observations A and B are thereafter sent to an identification system 11. The observations A and B are examined so as to determine whether or not they are compatible and correspond to descriptions of the same object in the real world. A compatibility criterion is predetermined as a function of the sector of application of the invention 12. If the observations A and B satisfy this criterion, then they are compatible and merged and are represented in FIG. 2 in the form AB or else ABC when these three values are compatible.

In the case of incompatible observations which do not satisfy this criterion and which visibly reflect the descriptions of two different objects, the method then determines the relations existing between the objects. Such an incompatibility between the observations can occur, for example, when a merge query is requested on the basis of sensors pointing, a priori, at one and the same storage device of an observation or surveillance system that may contain several objects. The incompatibility between the observations may be due, for example, to the fact that the sensors have observed two different objects which are, however, spatially close. In this case, the method will make it possible to account at one and the same time for the fact that two distinct objects exist and for the spatial relation existing between the two objects. Once these relations have been discovered, it will then be possible to decide which of the descriptions should be returned to the system from which the merge query originated.

Figure 1:
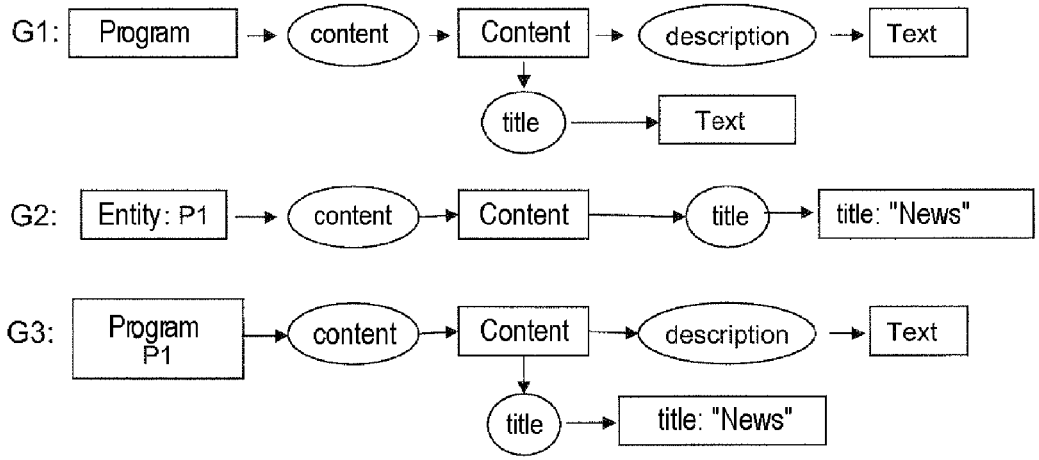
FIG. 1, an exemplary merging of two conceptual graphs.

In the various steps implemented, the method uses the formalism, such as that described in FIG. 1, of conceptual graphs to represent knowledge and information. The same model will be used to perform the merging process. The originality of the present patent application is notably the use of the conventional maximal join operator and its adaptation so as to take account of domain knowledge and user preferences. Advantageously, this will make it possible to merge data or information that is incompatible in the sense of the merging of graphs. The description will call upon merging heuristics inside the maximal join. These merging heuristics will be called "merging strategies". The merging strategies are compound functions which will make it possible to encode knowledge associated with a sector of application. They are used so as to extend the notion of compatibility between two concepts of two different graphs.

Figure 3:
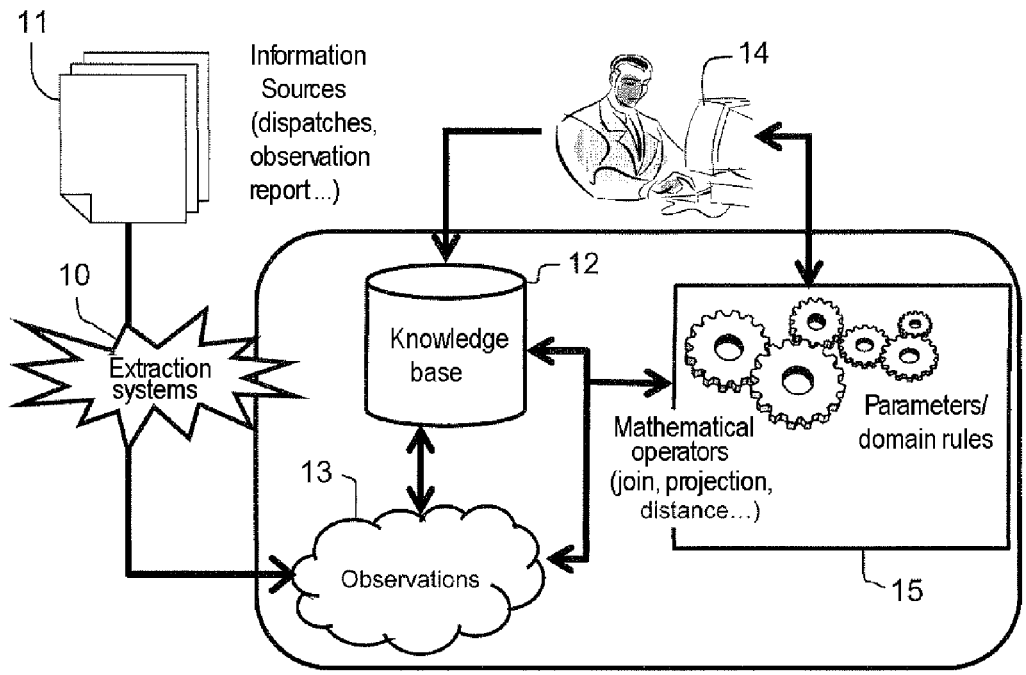

FIG. 3 represents in a schematic manner the elements required for the implementation of the invention. The system comprises several sensors Ci which will gather the information or data to be merged. This information is sent to an interpretation and extraction device 10 in order to transform it so that it appears in the form of conceptual graphs. The observations thus formatted are stored in a memory 13 or observation base which is linked up with a domain knowledge base 12 which contains various data relating to a domain, a domain sector or a knowledge sector, which will serve to parameterize the merging step. This knowledge base 12 consists for example of a user 14 of the system. This knowledge base will serve for the implementation of the various elements intervening in the method: mathematical operators, parameters, domain rules, etc. The interrogations are performed, for example, in the form of queries sent from the user to the module 15. The knowledge of the base 12 and the observations of the memory 13 are matched through the use of the operators of the module 15 so as to respond to the queries. These queries allow the user 14, for example, to view the representation of the real situation in accordance with various viewpoints. The information arising from the sensors is stored in the observation base, the information arising from the knowledge of the sector (knowledge base and domain rules) and entered by an operator of the system is, for its part, stored in the knowledge base.

TV Application

The example which follows will be given within the framework of a recommendation system used for intelligent digital television. The function of the recommendation system is, notably, to analyze the descriptions of televised programs and recommend or not a program to a specific user. Accordingly, the invention uses a merging platform such as that described in FIGS. 3 and 4 in order to obtain accurate and reliable descriptions of televised programs, both as regards programming planning and the description of the content of the program. The merging platform consists, for example, of modules and of physical equipment, such as memories, knowledge bases, processors and inputs/outputs allowing acquisition and communication of data between the merging system according to the invention and the devices for sensing the data and for recording or displaying results.

The example will be given within a framework where the number of television channels available is growing very rapidly, the objective of the system developed is to aid users to choose the televised programs that they will appreciate watching or saving. A first step consists in constructing a recommendation system for the televised programs, which system will thereafter be coupled to a video recording system making it possible to automatically record the programs relevant to a user when the latter is absent or else a system for displaying information which will thereafter be used by a user. Within the framework of the digital TV application, the recommendation system is constructed by virtue of a phase of learning the users' habits. The transmissions watched by the users are studied, by way of the characteristics of the programs in which they are interested. This definition is done automatically, via a learning phase, by a learning algorithm known to a person skilled in the art. The information is stored, for example, in an observation base or knowledge base.

Figure 4:
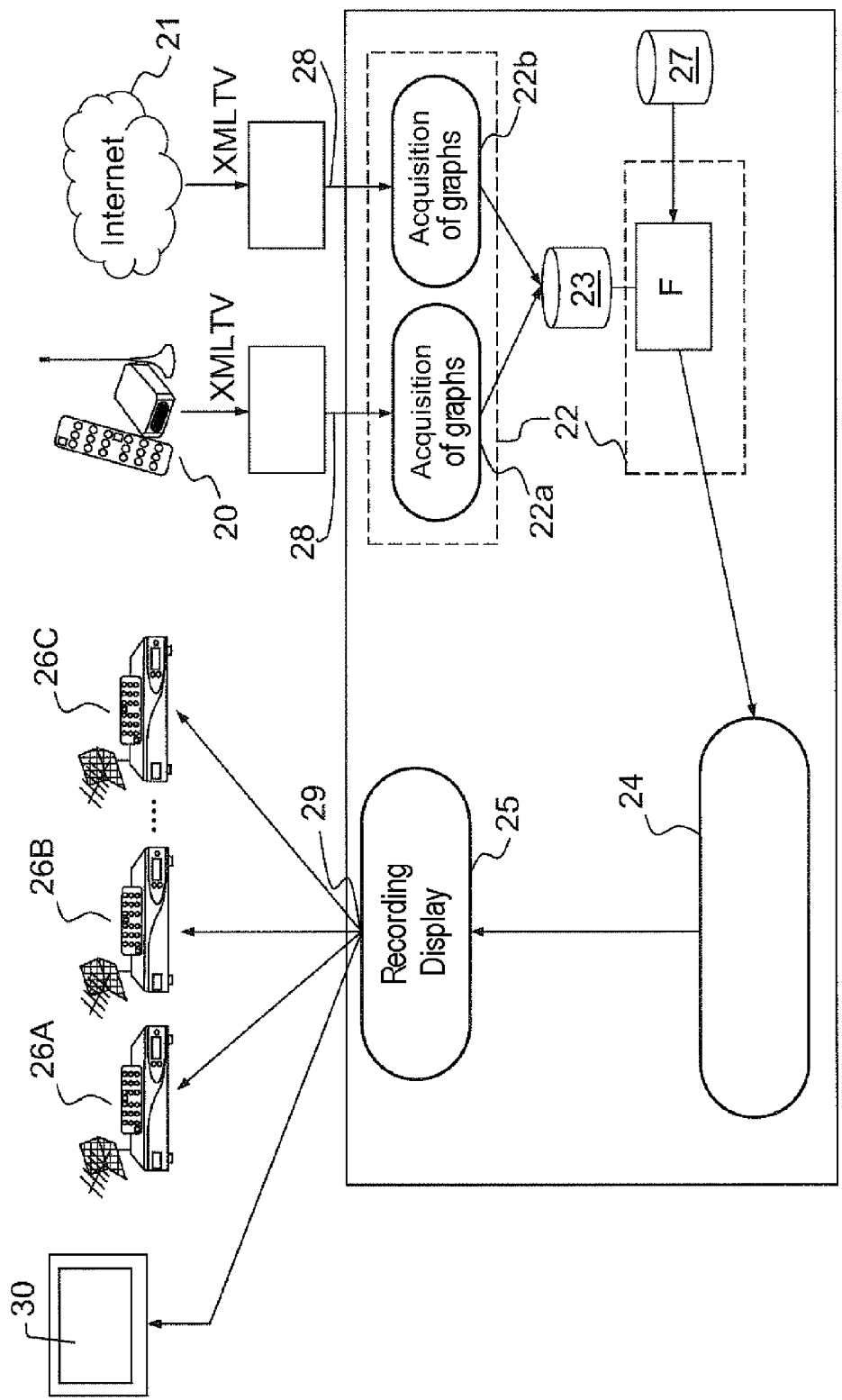

FIG. 4 is an exemplary possible architecture for the automatic recording of certain TV programs according to a user's preferences.

The system comprises two information sources 20, 21 which provide data in XMLTV format via inputs 28 of the system for merging and for managing the information obtained. The data arising from these two sources are processed so as to associate for each of these sources a graph of concepts 22$a$, 22$b$. The information of the two graphs is firstly stored in a database 23. It is thereafter merged F by taking account of the elements stored in the knowledge base 27 and according to the procedure detailed hereinafter which takes into account the user's preferences accessible in the knowledge sector. The merged information is thereafter sent to a device 24 the function of which is notably to analyze the descriptions of the televised programs, to determine the category to which a transmission belongs so as, thereafter, to recommend it or not to a user or else to send a signal allowing the recording thereof or else the display thereof on a screen as an aid to a user. This device 24 will also manage and control 25 the recording or otherwise of a transmission on video recording systems 26A, 26B, 26C or manage the transmission of a display signal to a screen 30 which can take the form of a recommendation or else be an alarm signal. It is also possible to send a signal to an audible alarm. The signals travel through the outputs 29 of the system or merging platform. The merging platform makes it possible to obtain accurate and sure descriptions of televised programs, both as regards programming planning and the description of the content of this program. The device 24 uses information stored in the observation base grouping together the graphs.

To decide whether or not to recommend a transmission to a user, beforehand, the transmissions which are watched by this user are analyzed automatically. Thereafter, it is necessary to have a means of comparing a new transmission with those which have or have not been watched in the past by this same user. For this purpose, categories are associated with the transmissions. A very simple way to associate a category with a transmission would be to take the category proposed by the TV magazine. However, this way of doing things is not accurate enough and gives fairly unsatisfactory results. For this reason, the people who are working on the recommendation aspect of the intelligent digital television system have incorporated an additional module which determines the category of a transmission as a function, among other things, of key words, of its category, of its time of broadcast, etc. The module 24 making it possible to classify a transmission into a category has to be distinguished from the process of merging and managing information. However, it is by virtue of the merging of the information available on the various sources, that it is possible to obtain sufficient characteristics on each of the transmissions so as to arrange them by category. This module making it possible to determine the category to which a transmission belongs is one of the modules which make direct use of the result of the merging module.

A new televised program is evaluated on the basis of its description. The description of such a program must contain the program start and end dates, as well as the content of this program. It is on this condition that the automatic recording system will record the right time slots. The recommendation system initially used the stream of data and metadata traveling via French digital terrestrial television (DTT), called "DVB" for Digital Video Broadcast. The DTT metadata comprise information such as the title, the start date, the duration, the kind of each televised program. However, very little information is available as regards the content of the program itself. In order to obtain more detailed descriptions the information arising from this source is merged with that arising from a second source: the on-line and pocket-size TV magazine represented by the reference 21. It is inter alia, these data which go to make up the database or knowledge base used by the invention. In addition to information about the title, the programming date and the duration of each program, the magazine produces information related to the content of each of them. Thus, there will often be a natural-language description or summary as well as an opinion on the quality of the program. For a film, for example, the director, the year of production, the actors, etc. will be mentioned.

According to the model of the conceptual graphs set forth previously, the ontology comprises all the entities existing in a sector of application as well as the relations which may exist between them. The word ontology is used to designate a structured set of terms and concepts representing the sense of an information field, be it through the metadata of a space of names, or the elements of a knowledge sector. The ontology constitutes per se a data model representative of a set of concepts in a sector, as well as the relations between these concepts. It is employed in order to reason with regard to the objects of the sector concerned.

Figure 5:
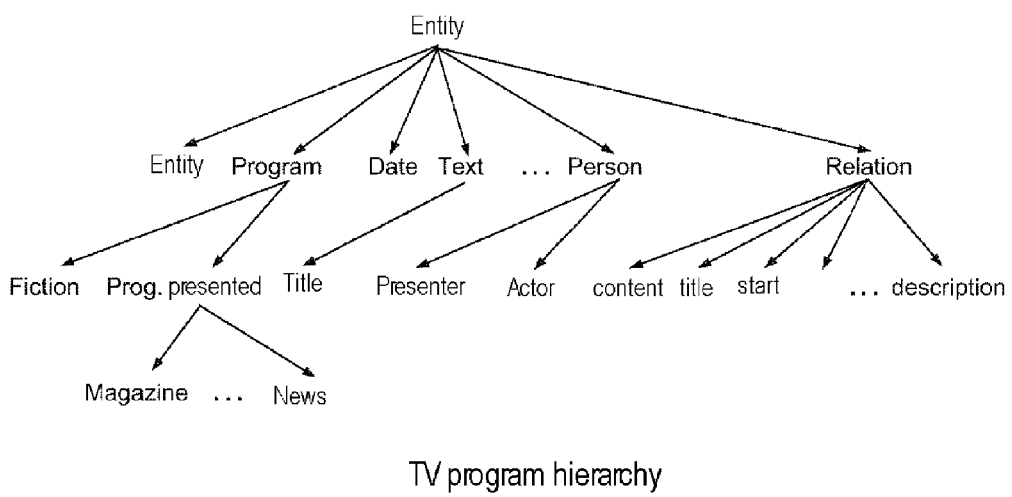

FIG. 5 represents an example of hierarchy and of sub-hierarchies for a TV program. The set of situations that may unfold are formulated through canonical bases. The potential interactions between the entities are represented using the conceptual graph associated with an exemplary model for a TV program. After having defined the model of the sector, the observations are automatically acquired in the formalism of graphs and stored in the form of conceptual graphs in memories of the TV system according to steps known to a person skilled in the art. FIGS. 6A and 6B show examples of observations made on a DVB stream and on the Web site of the "télépoche" periodical. These observations are stored in conceptual graph form. The right part and the left part of FIG. 6B present two conceptual graphs that the method will combine before merging them. Several possibilities exist for executing the merging of these two types of observation. The method according to the invention will use an extended maximal join function, as defined subsequently. The merging method according to the invention will be executed within a processor of the system, which will thereafter deliver a control message to the recording system 26 (FIG. 4).

The work data having been defined, the aforementioned merging strategies which come within an extension of the maximal join defined by the aforementioned prior art will now be detailed. For this reason, the construction of the set of merging assumptions for two graphs, remains directed by the search for compatible projections, the notion of compatibility between two concept nodes will be extended according to the principle described hereinbelow.

The definition of the aforementioned merging strategies is organized, in the present example, into two parts:
The definition of the compatibility conditions for two concepts or items of information, and
The calculation of the merged value of two concepts or items of information according to predefined compatibility conditions and which take account of the application sector or domain knowledge.

The merging strategies may be expressed in the form of a composition of functions:

Let E be the set of concept nodes defined on a support S or simplified ontology. Let $G_1$ and $G_2$ be two conceptual graphs defined on S. A merging strategy denoted strategy$_{merge}$ is defined as follows:

$$\text{strategy}_{merge} = f_{merge} \bigcirc f_{comp}: E \times E \to E \cup \{E \times E\}$$

where the symbol $\bigcirc$ corresponds to the mathematical operation of composition of functions, and $$\begin{cases} \text{where } f_{merge}: \{\text{true, false}\} \times E \times E \to \bigcup \{E \times E\} \text{ is a function for} \\ \text{merging the concept nodes of the graphs,} \\ \text{and, } f_{comp}: E \times E \to \{\text{true, false}\} \times E \times E \text{ is a function for testing} \\ \text{compatibility betweeen two concept nodes of the graphs.} \end{cases}$$

The result of the merging strategy is either the merged concept, if the initial concepts are compatible, or the initial concepts, if the latter are not compatible and therefore not mergeable.

Maximal Join According to a Merging Strategy

If E is the set of concept nodes defined on a support S. The graphs H, $G_1$ and $G_2$ are conceptual graphs defined on S. $f_{comp}$ is a function for testing compatibility defined on $E \times E \to \{\text{true, false}\} \times E \times E$ and $f_{merge}$ is a merge function defined on $\{\text{true, false}\} \times E \times E \to E \cup \{E \times E\}$.

The method according to the invention relates more particularly to the maximal join method which relies on the definitions of specialization, generalization and projection, known to a person skilled in the art.

Let $f_{comp}$ be a compatibility function defined on $E \times E \to \{\text{true, false}\} \times E \times E$, let $G_1$ and $G_2$ be two conceptual graphs having a common generalization H and let $P_1$ and $P_2$ be the projections $H \to G_1$ and $H \to G_2$, respectively. $P_1$ and $P_2$ are compatible according to the function $f_{comp}$ if, for each concept c of the graph H, the following conditions are complied with:

$P_1(c)$ and $P_2(c)$ have a common sub-type different from the absurd type,

The referents or components of $P_1(c)$ and $P_2(c)$ conform to their most general common sub-type, The referents of $P_1(c)$ and $P_2(c)$ are either equal, or one of the two is undefined, or $f_{comp}(P_1(c), P_2(c))=(\text{true}, P_1(c), P_2(c))$.

Let strategy$_{merge}=f_{merge} \bigcirc f_{comp}: E \times E \to E \cup \{E \times E\}$ if two projections $P_1(c)$ and $P_2(c)$ are compatible according to $f_{comp}$, then, by extension, $P_1(c)$ and $P_2(c)$ are said to be compatible according to strategy$_{merge}$.

The simple join of two concepts is an operation defined in the conceptual graphs model. We define its extension, the simple join of two concepts according to a merging strategy strategy$_{merge}=f_{merge} \bigcirc f_{comp}: E \times E \to E \cup \{E \times E\}$ as follows:

Let two concepts $c_1$ and $c_2$ be such that $c_1=[t_1:r_1]$ and $c_2=[t_2:r_2]$, $j=[t:r]$ is the join of $c_1$ and $c_2$ according to strategy$_{merge}$ if and only if $t_1$ and $t_2$ have a common sub-type different from the absurd type, t is the most general common sub-type of $t_1$ and $t_2$, $r_1$ and $r_2$, respectively the referents of $c_1$ and $c_2$ comply with t, $r_1$ is undefined and $r=r_2$ or $r_2$ is undefined and $r=r_1$ or $r_1=r_2=r$ or $f_{comp}(c_1, c_2)=(\text{true}, c_1, c_2)$ and $f_{mer}(c_1, c_2)=j=[t:r]$.

A definition of the maximal join according to a merging strategy such as strategy$_{merge}=f_{merge} \bigcirc f_{comp}: E \times E \to E \cup \{E \times E\}$ is therefore given by the following formulation:

Definition:

Let H be the most general common generalization of the graphs $G_1$ and $G_2$; $P_1$ and $P_2$ are two compatible projections of H onto $G_1$ and $G_2$ according to a merging strategy denoted strategy$_{merge}$. $P_1$ and $P_2$ are maximally extended.

If two graphs contain compatible projections of a common generalization H, these projections may be extended by finding a larger common generalization (containing more concepts and/or relations), containing H as sub-graph. Two compatible projections are termed maximally extended if they have no such extension.

Let H be a common generalization of the graphs $G_1$ and $G_2$. Let $P_1$ and $P_2$ be two compatible projections according to a function $f_{comp}$ such that $P_1: H \rightarrow G_1$ and $P_2: H \rightarrow G_2$. $P_1$ and $P_2$ are extended in a maximal manner if and only if there exists no common generalization H' of $G_1$ and $G_2$ such that H is a sub-graph of H'.

Let H be the most general common generalization of the graphs $G_1$ and $G_2$. $P_1$ and $P_2$ are two compatible projections of H onto $G_1$ and $G_2$ according to a merging strategy denoted $strategy_{merge}$. $P_1$ and $P_2$ are maximally extended. A join according to a merging strategy strategymerge on the extended projections is called maximal join according to strategymerge.

A join according to a merging strategy $strategy_{merge}$ on these extended projections is called maximal join according to $strategy_{merge}$ Merging Strategies The merging strategy calls upon notions defined hereinafter.

A similarity or dissimilarity is a numerically-valued mapping which makes it possible to measure the relationship between the individuals of one and the same set. For a similarity the relationship is all the stronger the larger its value. A similarity index or more simply a similarity on a set E is a mapping sim: $E \times E \rightarrow R^+$ which satisfies the following two conditions:

$$\forall (e,e') \in E \rightarrow E \times E; sim(e,e')=sim(e',e) \text{(symmetry)} \quad (k_1)$$

$$\forall (e,e') \in E \rightarrow E \times E \text{ with } e \text{ different from } e'; sim(e,e) = sim(e',e') > sim(e,e') \quad (k_2)$$

A similarity index is a mapping diss which satisfies condition $k_1$ hereinabove, and the following condition:

$$\forall e \in E diss(e,e)=0 \quad (k'_2)$$

The similarity index between two elements of a set may be normalized. In this case, the mapping $sim_{norm}: E \times E \rightarrow [0, 1]$ satisfies the two conditions $k_1$ and $k_2$ as well as the following condition:

$$\forall e \in E \rightarrow E sim_{norm}(e,e)=1 \quad (k_3)$$

A distance is a dissimilarity index which additionally satisfies the following two properties:

$$dist(e,e')=0 => e=e' \quad (k_4)$$

$$dist(e,e') \leq dist(e,e'')+dist(e'',e') \forall e,e',e'' \in E \text{(triangular inequality)} \quad (k_5)$$

Definition of Compatibility

The compatibility function implemented in the method according to the invention may be defined with respect to a criterion to be complied with in order to declare two items of information "compatible" for one or more values. For example, to fix matters, the compatibility function may be defined either as a function of the distance between two values, or as a function of any other similarity function defined by experts in the sector of application. The compatibility function between two nodes is of the following form:

$$f_{comp}: E \times E \rightarrow \{true, false\} \times E \times E$$

where E is the set of concept nodes defined on a support S and $G_1$ and $G_2$ are two conceptual graphs defined on S to be compared.

$$\forall (c_1, c_2) \in E \times E, \exists v = f_{comp}(c_1, c_2) \in V \text{ and } v = (b, c_1, c_2)$$

$$\begin{cases} \text{where } v \subset \{true, false\} \times E \times E \\ \text{and } b \in \{true, false\} \text{ where } b \text{ is a logic value} \end{cases}$$

The compatibility between two elements of one and the same set may be calculated, either with respect to the similarity existing between these two elements, or with respect to the distance separating it. The subsequent description gives two examples of defining the compatibility function according to the similarity measure and the distance measure. Each of the approaches is illustrated in a concrete case relating to the merging of the description of televised programs.

According to similarity, the compatibility of two elements may be defined as a function of the proportion of constituents that are identical between these two elements. Therefore, initially, a normalized similarity measure will be used to test the compatibility of two concepts, with a view to their merging. This similarity measure is determined by an expert in the sector of application and must comply with conditions ($k_1$), ($k_2$) and ($k_3$) recalled hereinabove. The compatibility function $f_{comp}$ is therefore of the following form:

$$f_{comp}(c_1, c_2) = sim(c_1, c_2) \geq thresh_{sim}$$

$$\begin{cases} \text{where } c_1 \text{ and } c_2 \text{ are concept nodes to be compared,} \\ c_1 \in E \text{ and } c_2 \in E \text{ where } E \text{ is the set of concept nodes} \\ \text{defined on a support } S, \\ \text{the value } thresh_{sim} \text{ is a value fixed as a function of the} \\ \text{sector of the application of the invention} \end{cases}$$

According to distance, the compatibility of two elements may be tested as a function of the distance separating these two elements. The distance measure is determined by an expert in the sector of application and must comply with conditions ($k_1$), ($k'_2$), ($k_4$) and ($k_5$) recalled hereinabove. Once the distance between two elements has been calculated, it is compared with a compatibility threshold defined likewise by an expert in the sector of application. The compatibility function then has the following form:

$$F_{comp}(c_1, c_2) = dist(c_1, c_2) \leq thresh_{dist}$$

$$\begin{cases} \text{where } c_1 \text{ and } c_2 \text{ are concept nodes to be compared,} \\ c_1 \in E \text{ and } c_2 \in E \text{ where } E \text{ is the set of concept nodes} \\ \text{defined on a support S,} \\ \text{the value } thresh_{dist} \text{ is fixed with respect to} \\ \text{a given application} \end{cases}$$

The compatibility function applied by the method having been defined, the following step of the method is to execute a merging step which will implement a merge function explained hereinafter.

For any pair of concept nodes, the merge function makes it possible to calculate, if it exists, the concept node corresponding to the merging of the initial nodes. If the initial nodes are not compatible, the result of the merge function will be the initial nodes. The merge function for two concept nodes is of the following form:

$$f_{merge}: \{true, false\} \times E \times E \to E \cup \{E \times E\}$$

where E is the set of concept nodes defined on a support S and $G_1$ and $G_2$ are two conceptual graphs defined on S to be merged.

Moreover:

$$\begin{cases} f_{merge}(true, c_1, c_2) = f_{mer}(c_1, c_2) = c \\ f_{false}(true, c_1, c_2) = Id(c_1, c_2) = (c_1, c_2) \end{cases}$$

where $f_{mer}$: E×E→E is a function defined by an expert in the sector of application c∈E is the concept resulting from the merging of $c_1$ and $c_2$ Id is the identity function defined on E×E It is sometimes necessary to know the context of two observations in order to determine whether or not they are compatible, and to thereafter determine the result of their merging. In this case, the compatibility and merge functions defined by the experts in the sector will take into account the concept nodes and the relations situated in the neighborhood of the concept nodes studied.

Applied to the data acquired within the framework of the realization of an intelligent interface for digital television, the implementation of the comparison step and of the merging step is described in conjunction with three strategies given by way of example.

- A first strategy may be to extend the notion of compatibility between the dates. Two dates are compatible if the difference between the two is less than a given threshold value, for example 5 minutes. If two dates are compatible but different, the smaller date will be chosen if it is the program start date, otherwise the later date will be chosen.
- According to a second strategy, the notions of compatibilities are extended between the dates and the titles. The compatibility between two dates is calculated as for the first strategy. Two titles are compatible if one of them is contained in the other.
- According to a third strategy, the notion of compatibility is also extended between the dates and the titles. The compatibility between two dates is calculated as for the first strategy. According to this strategy, two titles are compatible if the length of the sub-strings common to the two titles exceeds a given threshold.

The illustration will be given by testing the compatibility of two concept nodes of Title type by implementing the compatibility function used in the third strategy.

The compatibility function $f_{comp}$ is defined on $E_T \times E_T \to \{true, false\} \times E_T \times E_T$. The value of a concept of Title type is a character string representing the title of the program described. The similarity function relies on the aggregated length of the character sub-strings common to the two titles and it is defined as follows:

Let $E_T$ be the set of nodes of Title type, n1 and n2 two Title nodes such that n1=[Title:t1] and n2=[Title:t2]. For the calculation of the similarity between two Title nodes, we define the similarity function sim: $E_T \times E_T \to [0, 1]$ such that:

$$sim([Title: t1], [Title: t2]) = sim_{title}(t1, t2)$$

With $$sim_{title}(t1, t2) = \frac{sizeCommonSubStrings(t1, t2)}{\max(size(t1), size(t2))}$$

Where $$\begin{cases} Max: N + \times N + \to N + \\ \text{is such that } \forall x, y \in N \max(x, y) = x \text{ iff } x \le y \text{ and} \\ \max(x, y) = y \text{ otherwise} \\ Size: S \to N +, \\ \text{Such that } \forall s \in S, size(s) = x, \text{ with } x \text{ the number of} \\ \text{characters of } s \text{ and where } S \text{ is the set of character strings,} \\ sizeCommonSubStrings: S \to N + \\ \text{such that } \forall s \in S, sizeCommonSubStrings(s_1, s_2) = \\ \text{with } x \text{ the total number of characters included in the} \\ \text{common sub-strings of } s_1 \text{ and } s_2 \text{ and where} \\ S \text{ is the set of character strings.} \end{cases}$$

The numerical example which follows has been performed by testing the compatibility of concept nodes of Date type. These are in fact the start and end broadcasting schedules for the programs. Intuitively, it has been chosen to represent the fact that two schedules that are less than 5 minutes apart are compatible. In order to manipulate these schedules in the form of integers and thus make comparisons easier, a simple transformation is applied, prior to any compatibility test, to the schedules. Each schedule is given in the form of the number of seconds which has elapsed from a reference date. The compatibility function $f_{comp}$ is therefore defined on: $E_D \times E_D \to \{true, false\} \times E_D \times E_D$, with $E_D$ the set of concept nodes of Date type. Let $nd_1 \in E_D$ and $nd_2 \in E_D$ be two Date nodes, such that $nd_1$=[Date:d1] and $nd_2$=[Date:$d_2$]. The distance dist:N×N→{true, false} is defined as follows:

$$dist([Date:d_1],[Date:d_2]) = dist_{date}(d_1, d_2)$$

with $dist_{date}(d_1, d_2) = \|d_1 - d_2\| \le 300$

The schedules are given in seconds and the threshold corresponds to 5 minutes, i.e. 300 seconds.

According to another embodiment, the invention also applies within the sector of crisis management. In this application, the definition of the model of the sector is the very first step of the merging process. For this purpose, as illustrated in FIG. 7, an ontology of the sector is defined, for example, as the description of a geopolitical crisis.

The set of situations that it is desired to research with the aid of non-instantiated canonical conceptual graphs is thereafter defined. The relations potentially existing in the real world are thus defined. The example hereinbelow shows an abstract situation to be researched in the real world. It describes an event of repression type which takes place at a given date, the victim of which is an entity that supports a certain group and is opposed to another. The repression is carried out by a group of people that likewise supports one group and is opposed to another.

[Repression]-
    -r__date->[DateCal],
    -agent->[GroupOfPeople]-
        -supports->[GroupOfPeople: ?y],
        -opposed_to->[GroupOfPeople: ?x];
    -victim->[Entity]-

-continued

```
    -supports->[GroupOfPeople: ?x],
    -opposed_to->[GroupOfPeople: ?y];
-consequence->[Influence]-patient->[GroupOfPeople:?x]
-consequence->[Influence]-patient->[GroupOfPeople:?y]
```

Once the modeling of the sector has been performed, it is necessary to acquire the observations which take the form of newspaper dispatches, of observation reports coming from human observers on the ground. This corresponds to observations acquired by virtue of an engine for extracting information on textual data.

It is to these data that the method will apply a maximal join step according to strategy$_{merge}$ defined previously.

Use of the Maximal Join as Merging Operator

The objective of the method being to merge as many possible pairs of compatible concepts between two graphs (two observations), we use the maximal join operator. This operator enables non-equal but compatible concepts to be merged. Moreover, it enables the greatest number of concepts possible to be merged. This operator gives, likewise, several results as a function of the various possible merging assumptions.

In the case of noisy real data, it will be possible for two observations of the same object to have slightly different values. In this case, the maximal join operator will not permit the merging of the two observations, whereas, with knowledge of the sector, an expert will easily be able to say that it was necessary to merge it since it represented various views of the same object. An example of such a case is given below.

The merging of:
[Repression]-agent->[Police]
And of:
[Repression]-agent->[policemen]
Using the maximal join would result in the following graph:
[Repression]
    - -agent->[Police],
    -agent->[policemen], Now, knowledge of the sector affords an awareness that policemen work within an institution named "Police" and that these two concepts could therefore be merged.

The method will parameterize this device, so as to incorporate knowledge of the domain, necessary for the merging process.

Use of the Projection as Query Operator

When the observations relating to a situation are acquired and stored in the form of conceptual graphs (optionally after merging these observations), it is necessary to be able to interrogate the knowledge base thus constructed and to facilitate access to the information. Here again, storage in the form of graphs allows the use of all the operators defined on such structures. In particular, the projection operator is used so as to formulate queries and to submit thereto the knowledge base.

The projection makes it possible to find the specialized occurrences of a query graph. For example, the following query graph:

[Repression: ?x]-agent->[GroupOfPeople: "rebels"]

will make it possible to obtain the list of repressions that have been reported by the various sensors (or observers), and on the initiative of the group of people named "rebels".

The accurate projections being difficult to utilize as they stand, we propose, as for the merging, to use heuristics so as to use approximate projections. The objective of these heuristics is to incorporate domain knowledge into the query operator, here, the projection.

Parameterization with the Aid of Domain Heuristics

The method being generic, it is thereafter necessary to be able to parameterize it easily so as to adapt it to the sector studied. The method therefore comprises a set of rules arising from domain knowledge. The use of such rules makes it possible to inject domain knowledge into the merging platform with the aid of heuristics also called strategies.

The strategies defined for the identification step are called "choice" strategies since they make it possible to choose the description to be returned in response to the merge query. The strategies used during the merging step are "merging strategies", those used for querying the knowledge base, "query strategies".

All cases involve rules or functions incorporating domain knowledge in relation to the observations performed. For the choice strategies, the premises of these rules are conceptual graphs representing the observations, as well as conditions on the values of the concepts and relations of these graphs (use of the distance metrics). The conclusion is a conceptual graph corresponding to the response to be dispatched relating to the query of identification of the valid observation(s)—which will optionally have to be merged.

As regards the merging strategies, the premises of the rules are the two relations to be merged. So as to take the context of each of the observations into account, the conditions present in the premises of the rules can pertain at one and the same time to the values of the relations and related objects to be merged, but also on the complete graph describing the observation. The conclusion of a merging strategy is the merged relation. Stated otherwise, these are the two objects resulting from the merging of the two pairs of objects observed. These two objects being themselves linked by the relation corresponding to the merging of the two initially observed relations.

The advantage of using such merging strategies is the possibility of associating, with this generic method, merge functions which are moreover widely studied and tested in some sectors.

Various Applications

The merging system according to the invention may be implemented within a communication network composed of several processors (on which are implemented the sensors, the effectors and the merging system) linked together.

The storage of the information (knowledge base for the sector and observation base) may be performed on hard disks.

A sensor, within the framework of this invention, may be at one and the same time a physical device (camera, radar, microphone, etc.) and the device for processing the corresponding data.

The subject of the invention exhibits notably the advantages listed hereinafter: the possibility of merging information extracted from an observations report made by a human with information extracted from newspaper dispatches or yet other sources giving an account of the same event.

The method is applied in respect of complex situations composed of several players or objects interacting. It applies in respect of merges of data of high semantic level using domain knowledge which has a yet higher semantic level.

Several configurations of the sensors or of the data acquired via the sensors will profit from the advantages conferred by the invention. We give here a non-exhaustive list of these configurations.

Observation Absent on One of the Sensors

When one of the sensors is faulty, it may happen that there is just a single observation. This observation must therefore be, by itself, the result of the merge query. In a system managing the certainties and the confidences associated with each merge result, the recognition of this configuration is important, since it can have an impact on the general confidence associated with the merged result.

Object Unrecognized by One of the Sensors

This case must lead, on the one hand, to the recognition by the merging platform of the unknown character of the object observed by one of the sensors. Moreover, the platform must return to the system that transmitted the query the observation performed by the sensor that recognized the object without merging said observation with whatever.

Incompatible Observations of Two Different Objects

In this case, the merging of the two observations must not take place. The merge attempt must fail, but it is sometimes preferable also that the query that led to this merge request not remain without a response. For this reason, the two observations must be studied so as to determine which of the sensors has observed the appropriate object so as to return its description to the system that transmitted the merge query.

Various Levels of Granularity on the Objects Observed According to the Sensor

Because of the difference in accuracy of the sensors, it may happen that two observations seem incompatible and therefore non-mergeable, whereas they are indeed actually two observations of the same object. Thus, an object may be observed as a whole by one of the sensors, whereas a second will observe only a part of the object. Moreover, the sensor observing only a part of the object will give an account, most of the time, of more details relating to this object. It will then be necessary for the merging platform to understand that such a configuration of the observations is involved. Moreover, it will be beneficial to utilize both the very detailed portion of the information and also the overall picture of the object.

Observations of the Same Object with Different Viewpoints

The viewpoint or vocabulary of the sensor can also bring about another typical case: two observations relate to the same object, but the way of expressing it is different depending on the sensor studied. These two observations will then not be declared to be incompatible, since the knowledge of the sector makes it possible to assert that it is indeed the same object in reality.

Thus, the method and the system according to the invention make it possible to merge knowledge in a manner which is homogeneous and independent of the modalities under which the information is given. Moreover, this knowledge may arise from the various merging levels. The method is generic and may be applied whatever the sensors delivering the observation and whatever the observed situation.

The invention claimed is:

1. A method for merging information of high semantic level representing complex situations comprising several items of information or data originating from several sensors, said method being executed on a processor and comprising:

acquiring the several items of information or data arising from at least two sensors in raw form and transforming the several items of information or data using said processor to cast the several items of information or data into a form of conceptual graphs, a conceptual graph representing several concepts and relations which exist between the several concepts, a conceptual graph comprising several entity nodes and relation nodes, with a set of concept nodes E defined on a support S, two conceptual graphs $G_1$ and $G_2$ defined on the support S, and the two conceptual graphs $G_1$ and $G_2$ being stored in a database;

defining a knowledge base containing information or data specific to a sector of an application of data merging and rules applied in said sector of the application, and transforming said information or data specific to the sector of the application using the processor to present said information or data specific to the sector of the application in a form of conceptual graphs;

determining a merging strategy denoted $strategy_{merge}$ as follows:

$strategy_{merge} = f_{merge} \bigcirc f_{comp}: E \times E \rightarrow E \cup \{E \times E\}$, where $f_{merge}: \{true, false\} \times E \times E \rightarrow E \cup \{E \times E\}$ is a merge function for merging concept nodes of graphs, and $f_{comp}: E \times E \rightarrow \{true, false\} \times E \times E$ is a function for testing compatibility between two concept nodes of the graphs;

applying the merging strategy to the information or data arising from the knowledge base and from an observation base taking the form of graphs to produce merged data; and sending the merged data to a decision making system, wherein:

the two conceptual graphs $G_1$ and $G_2$ have a common generalization H, and projections $P_1: H \rightarrow G_1$ and $P_2: H \rightarrow G_2$, $P_1$ and $P_2$ are compatible according to the function $f_{comp}$ if, for each concept c of the graph H, the following conditions are complied with:

$P_1(c)$ and $P_2(c)$ have a common sub-type different from an absurd type, referents or components of $P_1(c)$ and $P_2(c)$ conform to their most general common sub-type, and the referents of $P_1(c)$ and $P_2(c)$ are either equal, or one of the two is undefined, or $f_{comp}(P_1(c), P_2(c)) = (true, P_1(c), P_2(c))$.

2. The method according to claim 1, wherein a function expressed in the following form is used as compatibility function between two nodes:

$f_{comp}: E \times E \rightarrow \{true, false\} \times E \times E$, wherein $\forall (c_1, c_2) \in E \times E, \exists v = f_{comp}(c_1, c_2) \in V$ and $v = (b, c_1, c_2)$ where $v \subset \{true, false\} \times E \times E$ and $b \in \{true, false\}$, where b is a logic value.

3. The method according to claim 1, wherein a compatibility function $f_{comp}$ is used between two concept nodes $c_1, c_2$ of said two conceptual graphs $G_1$ and $G_2$, wherein the compatibility function $f_{comp}$ is determined with respect to a similarity between two elements of the two conceptual graphs $G_1$ and $G_2$ to be merged, where $f_{comp}(c_1, c_2) = sim(c_1, c_2)$ is greater than or equal to a threshold value.

4. The method according to claim 1, wherein:

compatibility of two elements is defined as a function of a proportion of constituents that are identical between the two elements; and a normalized similarity measure complies with the conditions:

$\forall (e, e') \in E \times E; sim(e, e') = sim(e', e)$, $\forall (e, e') \in E \times E$ with $e$ different from $e$, $sim(e, e) = sim(e', e') > sim(e, e')$, and $\forall e \in E sim_{norm}(e, e) = 1$, where sim is a similarity index defined on $E \times E \rightarrow R+$.

5. The method according to claim 1, wherein a compatibility function $f_{comp}$ is used between two concept nodes $c_1, c_2$ to be compared, a concept node being associated with at least one of the two conceptual graphs $G_1$ and $G_2$ being calculated as a function of a distance defined such that $f_{com}(c_1, c_2) = dist(c_1, c_2)$ is less than or equal to a threshold value.

6. The method according to claim 5, wherein the distance is determined as a function of data stored in the knowledge base and satisfies the conditions:

$\forall (e,e') \in E \times E; sim(e,e')=sim(e',e),$ $\forall e \in E diss(e,e)=0,$ $dist(e,e')=0 => e=e',$ and $dist(e,e') \leq dist(e,e'')+dist(e'',e') \forall e,e',e'' \in E.$ 7. The method according to claim 1, wherein:

$\begin{cases} f_{merge}(\text{true}, c_1, c_2) = f_{mer}(c_1, c_2) = c \\ f_{false}(\text{true}, c_1, c_2) = Id(c_1, c_2) = (c_1, c_2) \end{cases},$ where $f_{mer}$: $E \times E \rightarrow E$ is a function defined by an expert in the sector of application, $c \in E$ is the concept resulting from merging of $c_1$ and $c_2$, and Id is an identity function defined on $E \times E$.

8. The method according to claim 1, wherein:
the method is performed in a TV recording device for recording TV programs,
applying the merging strategy to the information or data arising from the knowledge base to produce merged data comprises applying the merging strategy to user preferences present in the knowledge base, the knowledge base comprising a module configured to associate a TV transmission with a category, and
sending the merged data to the decision making system comprises transmitting a representative signal or a control signal to the TV recording device.

9. A system allowing merging of information of high semantic level representing complex situations comprising several objects or data originating from several sensors, the system comprising:
several sensors configured to observe information and inputs;
a knowledge base comprising elements characteristic of a merging application and configured for application of a merging strategy;
an information base storing all of the information or data arising from the several sensors;
a processor configured to:
acquire the information or data arising from the several sensors in raw form and transform the several items of information or data to cast the several items of information or data into a form of conceptual graphs, a conceptual graph representing several concepts and relations which exist between the several concepts, a conceptual graph comprising several entity nodes and relation nodes, with a set of concept nodes E defined on a support S, two conceptual graphs $G_1$ and $G_2$ defined on the support S, and the two conceptual graphs $G_1$ and $G_2$ being stored in a database;
define a knowledge base containing information or data specific to a sector of an application of data merging and rules applied in said sector of the application, and transform said information or data specific to the sector of the application to present said information or data specific to the sector of the application in a form of conceptual graphs;
determine a merging strategy denoted strategy$_{merge}$ as follows:
strategy$_{merge}$=$f_{merge} \bigcirc f_{comp}$:$E \times E \rightarrow E \cup \{E \times E\}$, where $f_{merge}$:{true, false}$\times E \times E \rightarrow E \cup \{E \times E\}$ is a merge function for merging concept nodes of graphs, and $f_{comp}$: $E \times E$\{true, false\} $\times E \times E$ is a function for testing compatibility between two concept nodes of the graphs;
apply the merging strategy to the information or data arising from the knowledge base and from an observation base taking the form of graphs to produce merged data; and
at least one output configured to record or display results arising from the merging of the information or data, wherein:
the two conceptual graphs $G_1$ and $G_2$ have a common generalization H, and
projections $P_1$:H→$G_1$ and $P_2$:H→$G_2$, $P_1$ and $P_2$ are compatible according to the function $f_{comp}$ if, for each concept c of the graph H, the following conditions are complied with:
$P_1(c)$ and $P_2(c)$ have a common sub-type different from an absurd type, referents or components of $P_1(c)$ and $P_2f$ c) conform to their most general common sub-type, and
the referents of $P_1(c)$ and $P_2(c)$ are either equal, or one of the two is undefined, or $f_{comp}(P_1(c), P_2(c))$=(true, $P_1(c), P_2(c)$).

10. The system according to claim 9, wherein said merging system is in communication with a recording device for recording TV programs, and wherein said system further comprises two sources of information which provide data processed to associate a conceptual graph with each, information arising from each conceptual graph being merged by taking account of user preferences present in the knowledge base, the knowledge base comprising a module configured to associate a TV transmission with a category, and a module configured to transmit a representative signal or a control signal to said recording device.

* * * * *